United States Patent [19]

Otsuki et al.

[11] 4,423,172

[45] Dec. 27, 1983

[54] SELF-CURABLE COATING COMPOSITION FOR CATHODE-PRECIPITATING ELECTRODEPOSITION

[75] Inventors: Yutaka Otsuki, Yokohama; Yoshihiko Araki, Tokyo; Hiroyoshi Omika, Yokohama; Hajime Hara, Fujisawa; Kazuho Aoyama, Tokyo, all of Japan

[73] Assignee: Nippon Oil Co., Ltd., Tokyo, Japan

[21] Appl. No.: 363,427

[22] Filed: Mar. 30, 1982

[30] Foreign Application Priority Data

Apr. 3, 1981 [JP] Japan .................................. 56-50359

[51] Int. Cl.³ .............................................. C08K 5/07
[52] U.S. Cl. .................................... 523/454; 524/365; 524/376; 524/378; 524/407; 524/423; 524/430; 524/431; 524/444; 524/451; 524/500; 524/517; 524/535; 525/113; 525/296; 525/327.3; 525/450
[58] Field of Search ............ 525/450, 113, 327.3, 525/296; 524/364, 365, 376, 378, 407, 423, 430, 431, 444, 451, 500, 517, 535; 523/454

[56] References Cited

U.S. PATENT DOCUMENTS

| | | | |
|---|---|---|---|
| 3,988,281 | 10/1976 | Minami et al. | 525/327.3 |
| 4,033,917 | 7/1977 | Sekmakas | 525/296 |
| 4,251,414 | 2/1981 | Nakada et al. | 525/113 |
| 4,335,031 | 6/1982 | Hazan | 525/450 |
| 4,337,187 | 6/1982 | Hazan | 525/450 |
| 4,338,236 | 7/1982 | Hazan | 525/450 |
| 4,370,453 | 1/1983 | Omika | 525/450 |
| 4,373,072 | 2/1983 | Putzschke et al. | 525/450 |

*Primary Examiner*—Joseph L. Schofer
*Assistant Examiner*—Bernard Lipman
*Attorney, Agent, or Firm*—Bucknam and Archer

[57] ABSTRACT

A self-curable coating composition for cathode-precipitating electrodeposition is disclosed which essentially comprises a water-dispersble resin having a carbon-carbon double bond and a tertiary amino group and an epoxy resin having a teritary amino group and an unsaturated group of the formula

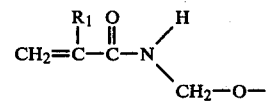

The two resins are neutralized by an acid to render the composition water-soluble or water-dispersible.

8 Claims, No Drawings

SELF-CURABLE COATING COMPOSITION FOR CATHODE-PRECIPITATING ELECTRODEPOSITION

BACKGROUND OF THE INVENTION

1. Field of the Invention

This invention relates to a self-curable coating composition for cathode-precipitating electrodeposition.

2. Prior Art

Generally, a resin having a certain basic group turns into a cationic resin in contact with water and when applied to electrodeposition, precipitates on a cathode. Cathode-precipitative coatings of this type can eliminate the tendency of the metal to be coated to dissolve in a coat bath and related problems which are encountered with conventional cathode-precipitative coatings prepared from resins having acid groups and rendered water-soluble by neutralization with bases.

The present inventors have previously found that the introduction of tertiary amino groups to high molecular-weight compounds having unsaturated groups or low polymerization degree polymers having carbon-carbon double bonds such as liquid polybutadienes will result in a resin having excellent film properties eligible for use in cathode-precipitating electrodeposition. See Japanese Laid-Open Patent Publication Nos. 51-119727, 52-147638 and 53-16048. Coating compositions having this type of resin are curable primarily by oxidative polymerization of the unsaturated groups in the resin but would require a relatively high baking temperature to effect curing for a practical length of time. Dryers such as salts of water-soluble metals like manganese may be used to cure the coated film at a lower backing temperature, in which instance however considerable amounts of such dryers are required. This would in turn result in defective coated surface finish, reduced corrosion-resistance and other objectionable phenomena.

The present inventors have also previously found that satisfactory coating compositions for cathode-precipitating electrodeposition can be obtained by adding water-dispersible modified epoxy resins having secondary amines to water-dispersible resins having carbon-carbon double bonds and tertiary amino groups, the resulting compositions being highly resistant to corrosion and stable in liquid form. See Japanese Laid-Open Patent Publication Nos. 55-60572 and 55-60851. However, these coating compositions were found to be poor in solvent-resistance due to insufficient oxidative polymerization of the modified epoxy resins used.

The present inventors have further previously found that excellent results as regards corrosion-resistance, solvent-resistance and coated film properties can be obtained by adding water-undispersible modified epoxy resins having certain $\alpha,\beta$-unsaturated carboxylic acids to water-dispersible resins having carbon-carbon double bonds and tertiary amino groups. See Japanese Laid-Open Patent Publication Nos. 54-69931, 55-55473 and 54-117857. The coating compositions disclosed therein are curable primarily by oxidative polymerization of the unsaturated groups in the resin and are found to be highly resistant to corrosion, but are not satisfactorily stable in liquid coating form.

SUMMARY OF THE INVENTION

With the foregoing drawbacks of the prior art compositions in view, the present invention is aimed at the provision of a coating composition for use in cathode-precipitating electrodeposition which has improved corrosion-resistance, improved solvent-resistance and high stability in its liquid form.

According to the invention, there is provided a coating composition comprising (A) a water-dispersible resin having a carbon-carbon double bond and a tertiary amino group and (B) an epoxy resin having a tertiary amino group and an unsaturated group of the formula

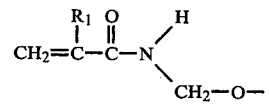

where $R_1$ is hydrogen or methyl radical.

More specifically, the coating composition according to the invention is characterized by the combination of 95–50 parts of Resin (A) which is a high molecular weight compound having a molecular weight of 500–50,000 and containing 50–200 millimols of a tertiary amino group per 100 grams of Resin (A) and 200–2,000 millimols of a non-conjugated carbon-carbon double bond per 100 grams of Resin (A), and 5–50 parts of Resin (B) which is a high molecular weight compound having a molecular weight of 300–30,000 and containing 50–300 millimols of a tertiary amino group per 100 grams of Resin (B) and 50–600 millimols of a group of the formula

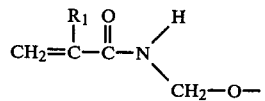

per 10 grams of Resin (B).

DETAILED DESCRIPTION OF THE PREFERRED EMBODIMENT

Resin (A) is prepared from a starting high molecular weight compound having a number average molecular weight of 500–50,000, preferably 1,000–5,000 and a carbon-carbon bond in an amount corresponding to an iodine value of 100–500, preferably 200–450, to which starting compound is added a tertiary amino group.

Examples of Resin (A) above defined include naturally occurring oils such as linseed, tung oil, soybean oil and dehydrated castor oil, stand oils resulting from heat treatment of these natural oils, low polymers of conjugated diolefins such as butadiene, isoprene and piperylene, low polymerization degree copolymers of two or more of these conjugated diolefins, and low polymerization degree copolymers of said conjugated diolefins and monomers having ethylenically unsaturated bonds, examples of such monomers being isobutylene, diisobutylene, styrene, $\alpha$-methylstyrene, vinyl toluene and divinyl benzene. Two or more of these mixtures may also be used. Resin (A) further includes petroleum resins having unsaturated groups and resulting from cationic polymerization of petroleum cracking fractions of 4–10 carbon atoms at 0°–100° C. in the presence of a Friedel-Crafts catalyst such as aluminum chloride, borontrifluoride or complexes thereof, and butadiene-isobutylene low polymerization degree polymers prepared with use of similar Friedel-Crafts catalysts.

Departures from the above specified molecular weight (500–50,000) of Resin (A) would lead to undesirable results. Greater molecular weights would result in poor water-solubility of the coating compositions. Smaller molecular weights would result in reduced strength of the coated film.

Iodine values less than 100 would lead to unsatisfactory curing of the coating and in excess of 500 would result in reduced storage stability.

Introduction of a tertiary amino group to the aforesaid unsaturated compound may be achieved by adding an $\alpha,\beta$-unsaturated dicarboxylic acid or its anhydride to the unsaturated compound, followed by reaction with a diamine compound having a tertiary and a primary amino group and represented by the formula

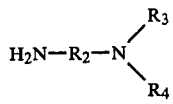

where $R_2$ is alkyl group of 1–10 carbon atoms, and $R_3$ and $R_4$ are hydrocarbon radicals of 1–20 carbon atoms and independent from each other in which each radical may be partly substituted by hydroxyl groups, or $R_3$ and $R_4$ may be combined to form a cyclic structure, thereby forming an imide bond. See Japanese Laid-Open Patent Publication Nos. 51-119727 and 52-147638. Another alternative is disclosed in Japanese Laid-Open Patent Publication No. 53-117030 wherein the aforesaid unsaturated compound is epoxidized by peracetic acid, the resulting epoxy groups being partly reacted with a secondary amino group-containing compound of the formula

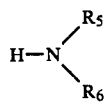

where $R_5$ and $R_6$ are independent from each other and hydrocarbon radicals of 1–10 carbon atoms, each of which radicals being partly substituted by hydroxyl groups, or $R_5$ and $R_6$ being combined to form a cyclic structure.

Alternatively, after the above epoxidized compound is added with tertiary amino groups, part of the remaining epoxy groups may be reacted with an $\alpha,\beta$-unsaturated carboxylic acid of the formula

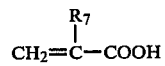

where $R_7$ is hydrogen or methyl group.

The tertiary amino groups may be added in an amount of 50–200 millimols, preferably 70–140 millimols per 100 grams of Resin (A). Smaller amounts would result in a coating composition being less water-dispersible, and greater amounts would lead to reduced water-resistance and unsatisfactory curing.

Resin (B) according to the invention is an epoxy resin reacted with a secondary amine and further reacted with a compound of the formula

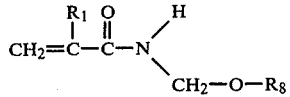

where $R_8$ is hydrogen or an alkyl group of 1–10 carbon atoms, at a temperature of 80°–150° C., preferably 100°–130° C. in the presence of an acid catalyst. To promote the reaction, it is desirable to remove in vacuum the formed water or alcohols from the reaction system.

There may be used certain solvents to reduce the viscosity of the reaction system, in which instance ketone or ether type solvents are preferred but alcohols are not desirable.

The epoxy resin used in the invention may be for example bisphenol-A and novolak.

Examples of the secondary amine to be added to the epoxy resin include dialkylamines such as dimethylamine, diethylamine, dipropylamine and dibutylamine, and alkanolamines such as methylethanolamine and diethanolamine. Reaction of the epoxy resin with the secondary amines takes place with ease even at room temperature. However, it is desirable to effect such reaction at 80°–120° C. with use of a secondary amine in an amount equivalent to the epoxy groups so as to eliminate any residue of unreacted epoxy groups and unreacted secondary amines.

To promote the reaction of addition of the compound

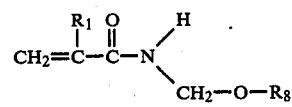

to the above amine-added epoxy resin, there may be used some acids such as formic acid, acetic acid and para-toluenesulfonic acid. An acid such as acetic acid, which may be used as a neutralizer for a cationic electrodeposition coating, is preferred as it can be remained in part or whole in the reaction system to be subsequently utilized as part of the neutralizer. This reaction takes place between the above formulated compound and the hydroxyl groups which are formed upon addition of an amine to the epoxy groups or such hydroxyl groups as are available from an alkanolamine. To prevent polymerization of double bonds in the reaction system, there may be used a suitable polymerization inhibitor such as hydroquinone and di-t.butyl-p cresol.

The compound of the formula

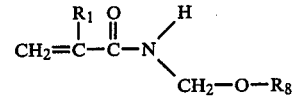

which is to be added to an epoxy resin having a tertiary amino group, may be used for reaction in an amount not exceeding an equimol or even half mol of the hydroxyl group in the amine-added epoxy resin so as to minimize unreacted components.

The ratio of Resin (A) to Resin (B) is 95–50 parts:5–50 parts, preferably 90–60 parts:10–40 parts. Smaller amounts of Resin (B) would result in reduced corrosion-resistance and greater amounts of Resin (B) would result in degraded surface levelness or smoothness of the coated film.

To neutralize and make Resins (A) and (B) water-soluble or water-dispersible, there may be used an inorganic acid such as chloric acid and sulfuric acid, or a water-soluble organic acid such as formic acid, acetic acid, propionic acid and lactic acid in an amount of 0.2–2.0 equimols, preferably 0.3–0.8 equimol based on the tertiary amino groups in both resins. Resins (A) and (B) may be rendered water-soluble either separately or when blended. Neutralization of these resins may be effected usually at room temperature by simply adding an acid.

Resin (A) or Resin (B) that has been rendered water-soluble or water-dispersible may be added with a dryer such as salts or metals like manganese, cobalt, zinc and lead, of which a water-soluble manganese compound is most preferred. Such manganese compound may be a manganese salt of an organic acid of relatively low molecular weight such as manganese formate, manganese acetate, manganese propionate and manganese lactate, or a manganese salt of an inorganic acid such as manganese sulfate, manganese chloride, manganese nitrate and manganese acetylacetonate. These manganese compounds may be used in an amount of 0.01–5.0 parts, preferably 0.1–1.0 parts by weight of manganese per 100 parts by weight of Resin (A). There may be used certain solvents in order to facilitate solubilization or dispersion of Resins (A) and (B) and also to improve stability of the resulting solution, flowability of the resin and surface finish of the coated film. Such solvents should be water-soluble and capable of dissolving each of Resins (A) and (B), preferred examples of which solvents are ethyl Cellosolve, propyl Cellosolve, butyl Cellosolve, ethyleneglycol dimethylether, diethyleneglycol dimethylether, diacetonic alcohol, 4-methoxy-4-methylpentanone-2 and methylethyl ketone. These solvents may be used in an amount of 10–100 parts by weight per 100 parts by weight of each of Resins (A) and (B).

The coating composition for cathode-precipitating electrodeposition according to the invention may be also blended with one or more of pigments including for example iron oxide, lead oxide, strontium chromate, carbon black, titanium dioxide, talc, aluminum silicate and barium sulfate. These pigments may be added directly to the coating composition. Alternatively, large amounts of the pigments may be blended with a portion of Resin (A) or Resin (B), which has been dissolved or dispersed in water, to produce a paste-like masterbatch for addition to the coating composition.

The invention will be further described by way of the following examples of preparation of Resins (A) and (B) respectively and manufacture of coating compositions therefrom.

I. Preparation of Resin (A)

Liquid polybutadiene having a number average molecular weight of 2,000 and 65% of 1,2-bonds was epoxized with peracetic acid to produce an epoxized polybutadiene containing 6.3 weight percent of oxirane oxygen. A 2-liter antoclave was charged with 1,000 grams of epoxized polybutadiene, 300 grams of ethyl Cellsolve and 55 grams of dimethyl amine. The admixture was reacted at 150° C. for 5 hours. The pressure was reduced to atmospheric to remove unreacted dimethyl amine. 80 grams of acrylic acid and 0.5 gram of hydroquinone were added, and the reaction was continued for one hour at 150° C. to produce a resin component (A-1) having a solids content of 80 weight percent. The resulting Resin (A) now having tertiary amino groups and unsaturated groups contained 100 millimols of tertiary amino groups per 100 grams of resin.

II. Preparation of Resin (A)

Liquid polybutadiene having a number average molecular weight of 2,000 and 65% of 1,2-bonds was epoxized with peracetic acid to produce an epoxized polybutadiene containing 6.5 weight percent of oxirane oxygen. A 2-liter antoclave was charged with 1,000 grams of epoxized polybutadiene, 80 grams of ethyl Cellsolve and 75 grams of dimethyl amine. The admixture was reacted at 150° C. for 5 hours. The pressure was reduced to atmospheric to remove unreacted dimethyl amine. 80 grams of acrylic acid and 0.5 gram of hydroquinone were added, and the reaction was continued for one hour at 150° C. to produce a resin component (A-2) for Resin (A). The resulting resin component (A-2) now contained 145 millimols of tertiary amino groups per 100 grams of resin and a solids content of 75 weight percent.

III. Preparation of Resin (A)

Liquid polybutadiene having a number average molecular weight of 2,000 and 65% of 1,2-bonds was added with maleic anhydride to produce maleinized polybutadiene having a semiacid value of 80. 1,000 grams of this polybutadiene was dissolved in 200 grams of ethyl Cellsolve, followed by reaction at 150° C. with 97 grams of N.N.dimethylpropylamine and 29 grams of monoethanolamine thereby producing a resin component (A-3) for Resin (A). This resin component had tertiary amines and hydroxyl groups resulting from imidization of succinic acid and secondary amine. Resin component (A-3) had an acid value of less than 1, 86 millimols of tertiary amine per 100 grams of resin and a solids content of 90 weight percent.

IV. Preparation of Resin (B)

A 3-liter separable flask was charged with 1,000 grams of bisphenol type epoxy resin containing 2.0 mols of epoxy groups, 400 grams of diethyleneglycol dimethylether and 210 grams of diethanolamine. The admixture was reacted at 80° C. for 2 hours, followed by addition of 10 grams of hydroquinone, 202 grams (2.0 mols) of N.methylol-acrylamide and 120 grams (2.0 mols) of acetic acid. Reaction was continued at 110° C. at a vacuum pressure of 300 mmHg for 3 hours. 50 grams of distillates were obtained which contained 32 grams of water and 18 grams of acetic acid. The reaction liquid was dissolved in THF and examined by gelpermeation chromatography to show no unreacted N.methylol acrylamide. The resulting resin (B-1) contained tertiary amino groups and acrylamide groups to be suitably used as Resin (B).

V. Preparation of Resin (B)

A 3-liter separable flask was charged with 1,000 grams of bisphenol type epoxy resin containing 2.0 mols of epoxy groups, 400 grams of diethyleneglycol dimethylether and 146 grams (2.0 mols) of diethylamine. The admixture was reacted at 80° C. for 2 hours, followed by addition of 10 grams of hydroquinone, 202 grams (2.0 mols) of N.methylol-acrylamide and 120 grams (2.0 mols) of acetic acid. Reaction was continued at 110° C. at a vacuum pressure of 400 mmHg for 5 hours. 75 grams of distillates were obtained which contained 34 grams of water and 41 grams of acetic acid. The reaction liquid was substantially free of unreacted N.methylol-acrylamide. The resulting resin (B-2) having tertiary amino groups and acrylamide groups was assigned to Resin (B).

EXAMPLE 1

125 grams of resin (A-1), 41 grams of resin (B-1) and 1.0 gram of acetic acid were admixed uniformly, followed by addition of deionized water to produce a water dispersion having a solids content of 20 weight percent. To this dispersion were added 1.3 grams of carbon black and 3.9 grams of lead oxide. Then, 1.3 grams of manganese acetate and deionized water were added thereby producing a black coating composition having a solids content of 15 weight percent. The resulting composition had a pH of 6.6 and showed no change in pH conductance at 40° C. after a lapse of 20 days. No coagulation of pigments was noted.

EXAMPLE 2

133.5 grams of resin (A-2), 55 grams of resin (B-1) and 1.0 gram of acetic acid were admixed uniformly, followed by addition of deionized water to produce a water dispersion having a solids content of 20 weight percent. To this dispersion were added 0.7 grams of carbon black, 6.3 grams of lead oxide and 28 grams of titania. Then, 1.3 grams of manganese acetate and deionized water were added thereby producing a black coating composition having a solids content of 15 weight percent. The resulting composition had a pH of 6.6 and showed no change in pH conductance at 40° C. after a lapse of 20 days. No. coagulation of pigments was observed.

EXAMPLE 3

111.1 grams of resin (A-3), 41 grams of resin (B-2), 13.9 grams of ethyl Cellsolve and 1.0 gram of acetic acid were admixed uniformly, followed by addition of deionized water to produce a water dispersion having a solids content of 20 weight percent. To this dispersion were added 1.3 grams of carbon black and 3.9 grams of lead oxide. Then, 1.3 grams of manganese acetate and deionized water were added thereby producing a black coating composition having a solids content of 15 weight percent. The resulting composition had a pH of 6.5 and showed no change in pH conductance or no pigment coagulation.

TABLE

| Test Results | Example 1 | Example 2 | Example 3 |
|---|---|---|---|
| Properties of Liquid Coat | | | |
| pH | 6.6 | 6.6 | 6.5 |
| Conductance (mΩ/cm) | 1.8 | 1.9 | 1.7 |
| Electrodeposit Performance | | | |
| Film Break Voltage (volts) | 340 | 310 | 300 |
| Film Resistance (kΩ · cm²) (*1) | 1000 | 800 | 750 |
| Coulomb (mg/c) | 19 | 24 | 18 |
| Coating Conditions | | | |
| Voltage (volts) | 210 | 200 | 190 |
| Time (min.) | 3 | 3 | 3 |
| Baking (°C. × min.) | 170 × 30 | 170 × 30 | 180 × 30 |
| Coat Thickness (μ) | 20 | 20 | 20 |
| Physical Test | | | |
| Pencil Hardness | 2H | 2H | 2H |
| Ericksen (mm) (*5) | >7 | >7 | 5.5 |
| Impact Strength: | | | |
| Front (cm) (*2) | >50 | >50 | 50 |
| Back | >50 | >50 | 30 |
| Chemical Test | | | |
| Solvent-Resistance (*3) | ◯ | ◯ | ◯ |
| Corrosion-Resistance (400 hours) | ◎ | ◎ | ◯ |
| (*4) | | | |

Notes:
(*1) Calculated from $\frac{\text{Coating Voltage (V)}}{\text{Residual Current A}} \times$ Surface Area of Coat (cm²)
(*2) DuPont impact, 500 g., ⅛ B
(*3) Coated film was scratched with methylisobutylketone 50 times over 1 minute and evaluated on the following scale.
  ◎: Unchanged
  △: Clouded where scratched
  X: Bare surface exposed
(*4) Maximum rust width measured from cuts in coated film (20μ, untreated substrated) with use of a spray of aqueous NaCl and evaluated as follows:
  ◯: less than 1 mm
  ◎: 1-2 mm
  △: 2-3 mm
  X: more than 3 mm
(*5) Maximum height of the film portion extruded without damage

What is claimed is:

1. A self-curable coating composition for cathode-precipitating electrodeposition comprising: (i) 95–50 parts of Resin (A) which is a high molecular weight compound having a number average molecular weight of 500–50,000 and containing 50–200 millimols of a tertiary amino group per 100 grams of Resin (A) and 200–2,000 millimols of a non-conjugated carbon-carbon double bond per 100 grams of Resin (A); and (ii) 5–50 parts of Resin (B) which is a high molecular weight epoxy resin having a number average molecular weight of 300–30,000 and containing 50–300 millimols of a tertiary amino group per 100 grams of Resin (B) and 50–600 millimols of a group of the formula

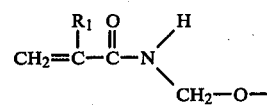

wherein $R_1$ is hydrogen or a methyl group, per 100 grams of Resin (B), said composition being neutralized with an acid to become water-soluble or water-dispersible.

2. A self-curable coating composition for cathode-precipitating electrodeposition as defined in claim 1 wherein said Resin (A) is prepared by introduction of teritary amino groups in a compound which is at least one member selected from the group consisting of linseed oil, tung oil, soybean oil, dehydrated castor oil, stand oils resulting from heat treatment thereof, low polymers of conjugated diolefins, low polymerization degree copolymers of two or more of said conjugated diolefins, low polymerization degree copolymers of said conjugated diolefins and monomers having ethylenically unsaturated bonds, said monomers being isobutylene, diisobutylene, styrene, α-methylstyrene, vinyl toluene or divinyl benzene, said Resin (A) additionally including petroleum resins having unsaturated groups and resulting from cationic polymerization of petroleum cracking fractions of 4–10 carbon atoms at 0°–100° C. in the presence of a Friedel-Crafts catalyst and butadiene-isobutylene low polymerization degree polymers prepared with use of a Friedel-Crafts catalyst.

3. A self-curable coating composition for cathode-precipitating electrodeposition as defined in claim 1 wherein said Resin (B) is an epoxy resin reacted with a secondary amine and subsequently with a compound of the formula

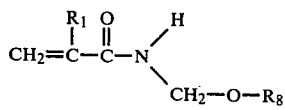

where $R_8$ is hydrogen or an alkyl group of 1-10 carbon atoms, at a temperature of 80°-150° C. in the presence of an acid catalyst.

4. A self-curable coating composition for cathode-precipitating electrodeposition as defined in claim 3 wherein said secondary amine is one selected from the group consisting of dimethylamine, diethylamine, dipropylamine, methylethanolamine and diethanolamine.

5. A self-curable coating composition for cathode-precipitating electrodeposition as defined in claim 1 wherein said acid is one selected from the group consisting of chloric acid, sulfuric acid, formic acid, acetic acid, propionic acid and lactic acid.

6. A self-curable coating composition for cathode-precipitating electrodeposition as defined in claims 1 further including a dryer which is a member selected from the group of metallic salts of manganese, cobalt, zinc and lead.

7. A self-curable coating composition for cathode-precipitating electrodeposition as defined in claim 1 further including a solvent selected from the group consisting of ethyl Cellosolve, propyl Cellosolve, butyl Cellosolve, ethyleneglycol dimethylether, diethyleneglycol dimethylether, diacetonic alcohol, 4-methoxy-4-methylpentanone-2 and methylethyl ketone.

8. A self-curable coating composition for cathode-precipitating electrodeposition as defined in claim 1 further including a pigment selected from the group consisting of iron oxide, lead oxide, strontium chromate, carbon black, titanium dioxide, talc, aluminum silicate and barium sulfate.

* * * * *